US006963267B2

(12) United States Patent
Murray

(10) Patent No.: US 6,963,267 B2
(45) Date of Patent: Nov. 8, 2005

(54) OPERATOR FOR A MOVABLE BARRIER AND METHOD OF USE

(75) Inventor: James S. Murray, Milton, FL (US)

(73) Assignee: Wayne-Dalton Corporation, Mt. Hope, OH (US)

( * ) Notice: Subject to any disclaimer, the term of this patent is extended or adjusted under 35 U.S.C. 154(b) by 380 days.

(21) Appl. No.: 10/098,219

(22) Filed: Mar. 15, 2002

(65) Prior Publication Data

US 2003/0174044 A1 Sep. 18, 2003

(51) Int. Cl.[7] .......................... H04Q 9/00; G08C 19/00

(52) U.S. Cl. ..................... 340/5.7; 340/5.23; 340/5.25; 340/5.26; 340/5.71; 340/5.28; 340/825.69

(58) Field of Search ................................ 340/5.7, 5.23, 340/5.25, 5.26, 5.71, 5.28, 825.69

(56) References Cited

U.S. PATENT DOCUMENTS

| | | | | |
|---|---|---|---|---|
| 4,529,980 | A | 7/1985 | Liotine et al. | 340/825.52 |
| 4,750,118 | A | 6/1988 | Heitschel et al. | 364/400 |
| 4,988,922 | A | 1/1991 | Shoda et al. | 315/223 |
| 4,988,992 | A | 1/1991 | Heitschel et al. | 340/825.69 |
| 5,148,159 | A | 9/1992 | Clark et al. | 340/825.22 |
| 5,252,966 | A | 10/1993 | Lambropoulos et al. | 340/825.69 |
| 5,369,706 | A | 11/1994 | Latka | 380/23 |
| 5,412,379 | A | 5/1995 | Waraksa et al. | 340/825.72 |
| 5,420,925 | A | 5/1995 | Michaels | 380/23 |
| 5,442,340 | A | 8/1995 | Dykema | 340/825.22 |
| 5,479,155 | A | 12/1995 | Zeinstra et al. | 340/825.22 |
| 5,479,157 | A | 12/1995 | Suman et al. | 340/825.31 |
| 5,517,187 | A | 5/1996 | Bruwer et al. | 340/825.31 |
| 5,558,257 | A | 9/1996 | Braun | 49/199 |
| RE35,364 | E | 10/1996 | Heitschel et al. | 364/400 |
| 5,576,701 | A | 11/1996 | Heitschel et al. | 340/825.31 |
| 5,583,485 | A | 12/1996 | Van Lente et al. | 340/525 |
| 5,598,475 | A | 1/1997 | Soenen et al. | 380/23 |
| 5,600,324 | A | 2/1997 | Reed et al. | 341/176 |
| 5,646,701 | A | 7/1997 | Duckworth et al. | 340/825.69 |
| 5,675,622 | A | 10/1997 | Hewitt et al. | 377/33 |
| 5,686,904 | A | 11/1997 | Bruwer | 340/825.3 |
| 5,699,065 | A | 12/1997 | Murray | 341/176 |
| 5,714,938 | A * | 2/1998 | Schwabl | 340/584 |
| 5,731,756 | A | 3/1998 | Roddy | 340/539 |
| 5,751,224 | A | 5/1998 | Fitzgibbon | 340/825.22 |
| 5,796,179 | A | 8/1998 | Honaga | 307/10.5 |
| 5,798,711 | A | 8/1998 | Issa et al. | 340/825.31 |
| 5,854,593 | A | 12/1998 | Dykema et al. | 340/825.22 |
| 5,872,513 | A | 2/1999 | Fitzgibbon et al. | 340/539 |
| 5,872,519 | A | 2/1999 | Issa et al. | 340/825.31 |
| 5,898,397 | A | 4/1999 | Murray | 341/176 |

(Continued)

*Primary Examiner*—Michael Horabik
*Assistant Examiner*—Scott Au
(74) *Attorney, Agent, or Firm*—Renner Kenner Greive Bobak Taylor & Weber

(57) ABSTRACT

A modifiable transmitter is used with an operator to control a position of a barrier. The operator includes a controller for comparing radio frequency transmissions received with stored serial numbers so that the controller can move the barrier when a radio frequency transmission matches any one of the stored serial numbers. The transmitter includes a housing that carries an encoder. A function button is carried by the housing, wherein actuation of the button generates in a non-standard way a new serial number that can be learned by the controller to allow the modifiable transmitter to move the barrier by emitting the radio frequency transmission. A restricted access may also be activated to generate a new serial number.

8 Claims, 7 Drawing Sheets

U.S. PATENT DOCUMENTS 5,914,667 A 6/1999 Issa et al. ................ 340/825.3
5,940,000 A 8/1999 Dykema ................ 340/825.22
5,949,349 A 9/1999 Farris et al. ........... 340/825.34
5,952,933 A 9/1999 Issa et al. .............. 340/825.31
6,025,785 A 2/2000 Farris et al. ........... 340/825.31
6,028,527 A 2/2000 Soenen et al. ......... 340/825.31
6,049,289 A 4/2000 Waggamon et al. ... 340/825.31
RE36,703 E 5/2000 Heitschel et al. ............. 700/90
6,081,203 A 6/2000 Fitzgibbon ............. 340/825.72
6,091,343 A 7/2000 Dykema et al. ....... 340/825.69
6,108,326 A 8/2000 Bruwer ....................... 370/342
6,154,544 A 11/2000 Farris et al. ................ 380/262
6,166,650 A 12/2000 Bruwer .................. 340/825.31
6,175,312 B1 1/2001 Bruwer et al. ........... 340/825.3
6,191,701 B1 2/2001 Bruwer .................... 340/825.3
6,194,991 B1 2/2001 Barrs et al. ................ 340/5.72
6,225,889 B1 5/2001 Furuta et al. ............... 340/426
6,243,000 B1 6/2001 Tsui .......................... 340/5.21

* cited by examiner

OPERATOR FOR A MOVABLE BARRIER AND METHOD OF USE

TECHNICAL FIELD

Generally, the present invention relates to a garage door operator system for use on a closure member moveable relative to a fixed member. More particularly, the present invention relates to a transmitter that is re-programmable for use with a movable barrier operator. More specifically, the present invention relates to a transmitter that can be forced to generate a new serial number in a rolling code type transmitter for use with a movable barrier operator.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired wall station or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with codes that change after every operation cycle so as to make it virtually impossible to "steal" a code and use it a later time for illegal purposes. An operation cycle may include opening and closing of the barrier, turning on and off a light that is connected to the operator and so on.

In order for a remote controlled device to work with an operator to control movement of the garage door, the operator must be programmed to learn the particular code for each transmitter. In the past, radio controls utilized a code setable switch, such as a ten-circuit DIP switch to set the data for both the transmitter and the receiver. Both the transmitter and the receiver's code switch would have to match for the transmitter to activate the receiver's output. This method did not allow for enough unique codes and was relatively easy for someone to copy the code and gain improper access. Accordingly, this process requires the setting of transmitter and receiver codes physically switched to identical settings for operation of the garage door.

Presently, most radio controls for garage doors use either a fixed code format wherein the same data for each transmission is sent, or a rolling-code format, wherein some or all of the data changes for each transmission. A fixed code transmitter, also known as a fixed address or a fixed serial number transmitter, is assigned and factory programmed into a transmitter's non-volatile memory during the manufacturing of the product. A receiver is designed to "learn" a transmitter's code and the transmitter's code is stored in the receiver's non-volatile memory. This increased the number of possible codes (from 1024 or 19,683 to millions) and eliminated the DIP switch. This also prevented the code from being visible, as is the case with the DIP switch transmitter, thus preventing theft of the code. But, shortcomings for using a fixed code are that a transmitter's code can still be stolen electronically by having a nearby transceiver (transmitter and receiver built as one) receive the valid transmitter's code then, at a later time, resending the code to activate the receiver. And it is still possible to make a transmitter that increments through all possible fixed codes to activate the receiver. Since the number of codes is greater than a DIP switch system, the time needed to step through every possible code greatly increases. But, the possibility of theft remains.

A rolling code transmitter is similar to a fixed code transmitter, but at least a portion of the address, also known as the code or serial number, is changed with every operation of the transmitter. The transmitter and the corresponding receiving unit use an algorithm to determine what the next code to transmit/receive shall be. Only the proper code will activate the receiver. Shortcomings of both devices are that once the transmitter is programmed at the factory during its assembly, a user cannot change the transmitter's code.

Such an exemplary rolling code system is disclosed in U.S. Pat. No. RE 36,703 which describes a system for remote control of garage doors and other movable barriers. The disclosed system uses an extremely large number of codes for a remote transmitter enabling the operator, wherein each transmitter has its own unique and permanent non-user changeable code. The operator includes a receiver that is capable of learning and storing codes for different transmitters such that the receiver can be actuated by more than one transmitted code, thus allowing two or more transmitters to actuate the same garage door. Although an improvement in the art, the aforementioned system is deficient in that the configuration of the transmitter can never be changed. In other words, one cannot automatically "unlearn" a transmitter for operating a receiver. Therefore, a need exists for transmitters that allow for the user to change the transmitter's serial number.

DISCLOSURE OF THE INVENTION

One of the aspects of the present invention, which shall become apparent as the detailed description proceeds, is achieved by an operator for controlling a position of a barrier, comprising: at least one radio frequency transmitter having a user-changeable serial number for radio frequency transmitting a radio frequency transmission corresponding to the transmitter; a radio frequency receiver adapted to receive a first radio frequency transmission from a first radio frequency transmitter and adapted to receive a second radio frequency transmission from a second radio frequency transmitter having a second user-changeable serial number; a memory comprising a plurality of storage locations; a controller having a controller controlled serial number location pointer and responsive to the reception by said radio frequency receiver of said first-mentioned radio frequency transmission for storing a first stored serial number corresponding to the first-mentioned radio frequency transmitter in one of said plurality of storage locations derived from the controller serial number location pointer, the controller responsive to the reception by said receiver of said second radio frequency transmission for storing a second stored serial number corresponding to the second radio frequency transmitter in another of said plurality of storage locations derived from the controller serial number location pointer, and the controller responsive to an operate mode and the reception of said first-mentioned radio frequency transmission after the storage of said first stored serial number for moving the barrier and responsive to said operate serial number and to the reception of said second radio frequency transmission after the storage of said first and said second stored serial number for moving said barrier.

Another aspect of the present invention is attained by an operator for controlling a position of a barrier comprising: at least one radio frequency transmitter each having a user-changeable serial number for radio frequency transmitting a radio frequency transmission corresponding to the transmitter; a radio frequency receiver adapted to receive a first radio frequency transmission from a first radio frequency transmitter and adapted to receive a second radio frequency transmission from a second radio frequency transmitter having a second user-changeable serial number; a memory comprising a plurality of storage locations; and a controller connected to said radio frequency receiver, said controller comparing any radio frequency transmissions received with learned serial numbers stored in said plurality of storage locations, wherein said controller enables movement of the barrier when any one of said radio frequency transmissions matches any one of said learned serial numbers stored in said plurality of storage locations.

Still another aspect of the present invention is attained by a modifiable transmitter used with an operator capable of controlling a position of a barrier, wherein the operator includes a controller for comparing radio frequency transmissions received with stored serial numbers so that the controller enables movement of the barrier when a radio frequency transmission matches any one of the stored serial numbers, the transmitter comprising: a housing; an encoder carried by said housing; and a function button carried by said housing wherein actuation of said function button causes said encoder to generate a new serial number that can be learned by the controller to allow the modifiable transmitter to move the barrier by emitting the radio frequency transmission.

Yet a further aspect of the present invention is attained by a method for generating and learning a new transmitter serial number for use with an operator capable of moving a barrier, comprising: providing in the operator a controller with a receiver capable of receiving radio frequency transmissions; providing a memory device connected to said controller, said memory device capable of having serial number based codes stored therein; providing a transmitter housing which carries therein at least an encoder capable of emitting radio frequency transmissions, and at least one function button for actuating said encoder; and generating a new serial number that can be transmitted by said encoder upon actuation of said at least one function button.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
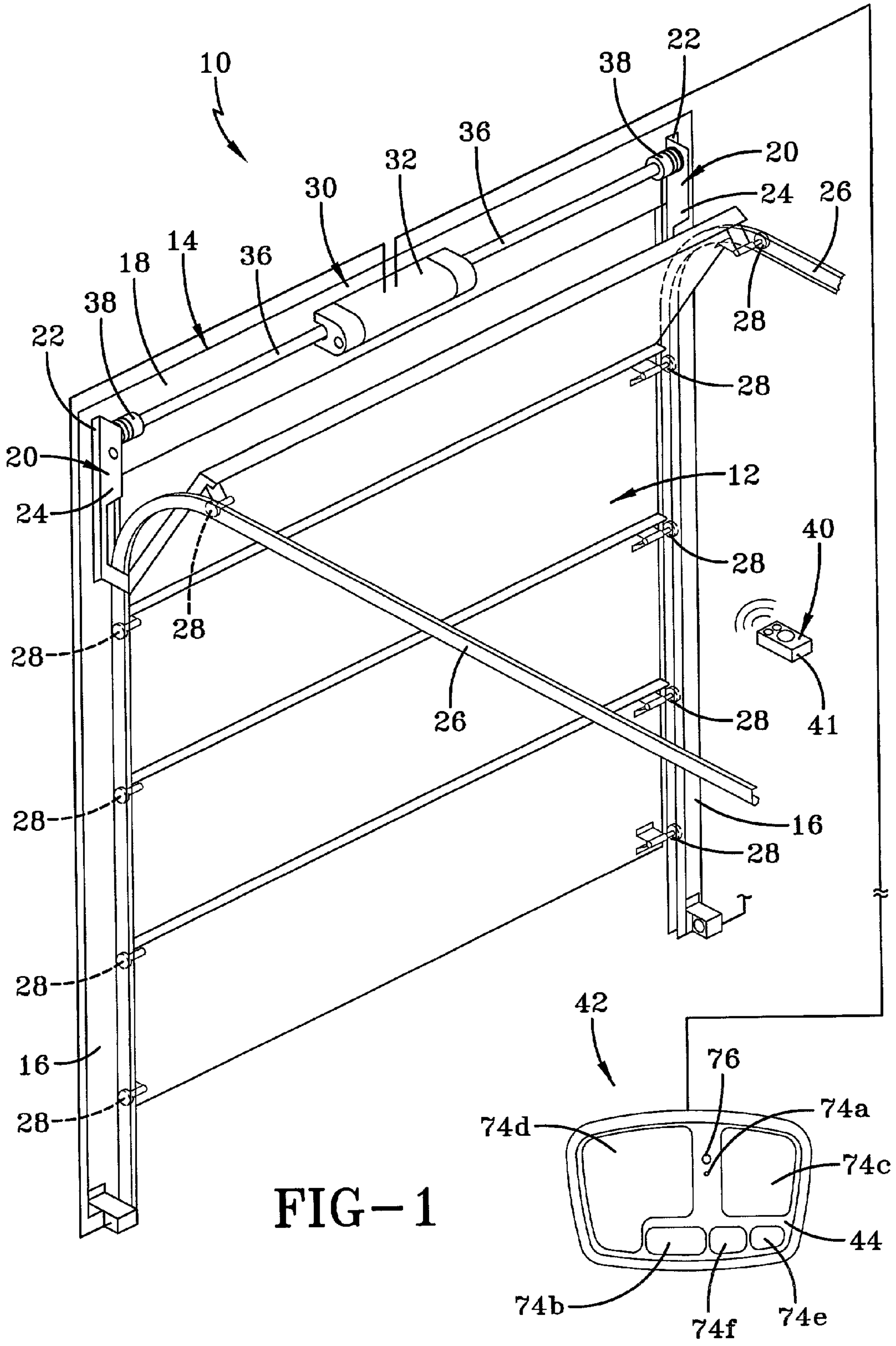
FIG. 1 is a perspective view depicting a sectional garage door and showing an operating mechanism embodying the concepts of the present invention.

A garage door operator system which incorporates the concepts of the present invention is generally indicated by the numeral 10 in FIG. 1 of the drawings. The system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. For example, the control routines can be easily incorporated into trolley type operators used to move garage doors.

The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the counter-balancing system 30 may be controlled by a wireless remote transmitter 40, which has a housing 41, or a wall station control 42, which has a housing 44, that is wired directly to the system 30 or which may communicate via radio frequency or infrared signals. The wall station control 42 is likely to have additional operational features not present in the remote transmitter 40. At the least, both devices are able to initiate opening and closing movements of the door coupled to the system 30. Although the present invention is described in the context of a sectional garage door, the teachings of the invention are equally applicable to other types of movable barriers such as single panel doors, gates, windows, retractable overhangs and any device that at least partially encloses an area.

Figure 2:
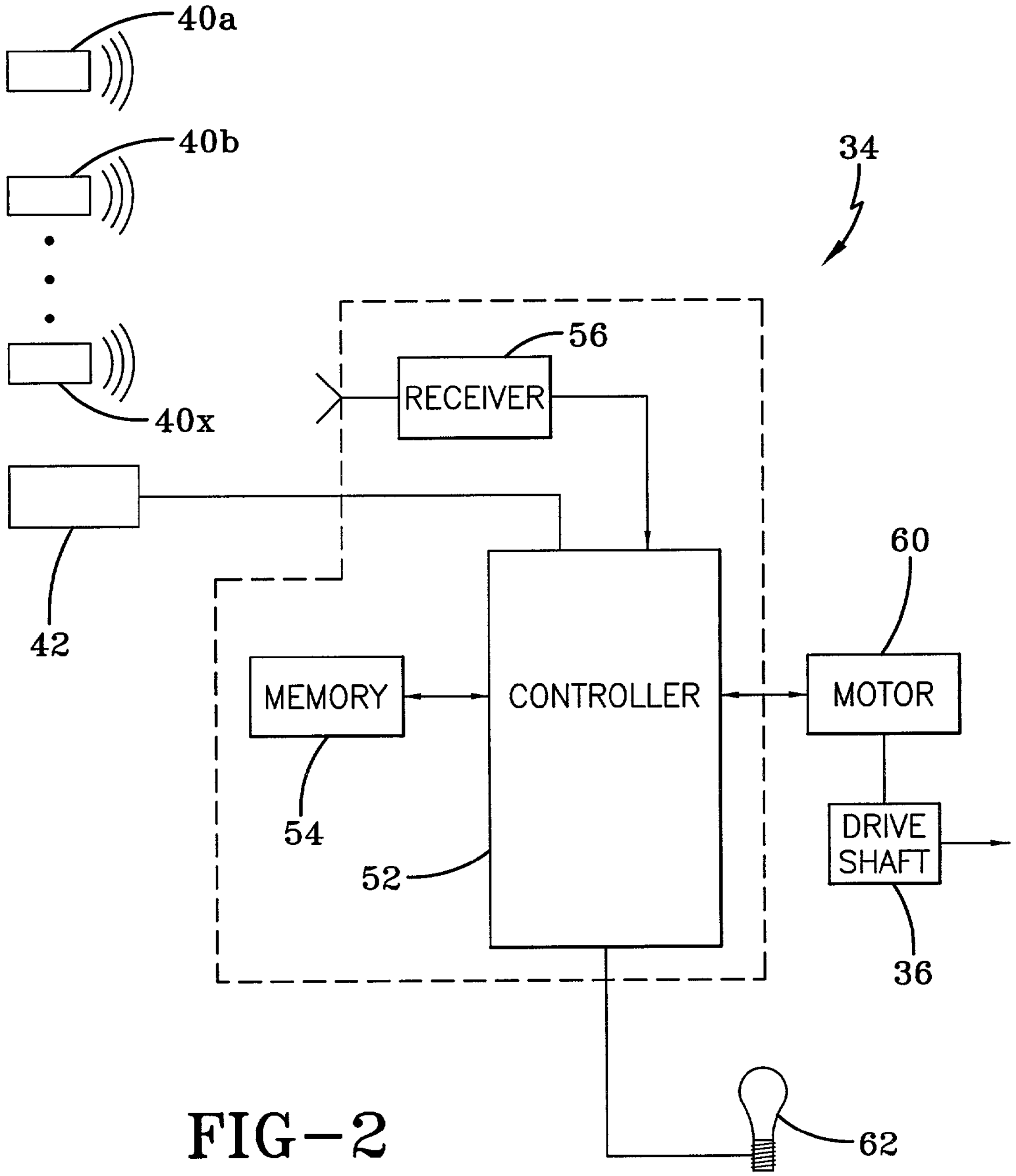
FIG. 2 is a block drawing of a an operator according to the present invention.

An operator mechanism, which is designated generally by the numeral 34 in FIG. 2, is contained within the housing 32 and monitors operation of the motor and various other elements connected to the operator mechanism 34 as will be described hereinbelow. A power source is used to energize the foregoing elements.

The operator mechanism 34 includes a controller 52 which incorporates the necessary software, hardware and memory storage devices for controlling the operation of the operator mechanism 34. In electrical communication with the controller 52 is a non-volatile memory storage device 54 for permanently storing information utilized by the controller in conjunction with the operation of the operator mechanism 34. Infrared and/or radio frequency signals are received by a receiver 56 which transmits the received information to a decoder contained within the controller. The controller 52 converts the received radio frequency signals or other types of wireless signals into a usable format. It will be appreciated that an appropriate antenna is utilized by the receiver 56 for receiving the desired signals. It will also be appreciated that the controller 52 is capable of directly receiving transmission type signals from a direct wire source as evidenced by the direct connection to the wall station 42. In any event, any number of remote transmitters 40*a–x* can transmit a signal that is received by the receiver 56 and further processed by the controller 52 as needed. Likewise, there can be any number of wall stations. If the signals received from either the remote transmitter 40 or the wall station control 42 are acceptable, the controller 52 generates the appropriate electrical signals for energizing the motor 60 which in turn rotates the drive shaft 36 and opens and/or closes the movable barrier. A light 62, which may be turned on and off independently or whenever an open/close cycle is initiated, may also be connected to the controller 52.

Figure 3:
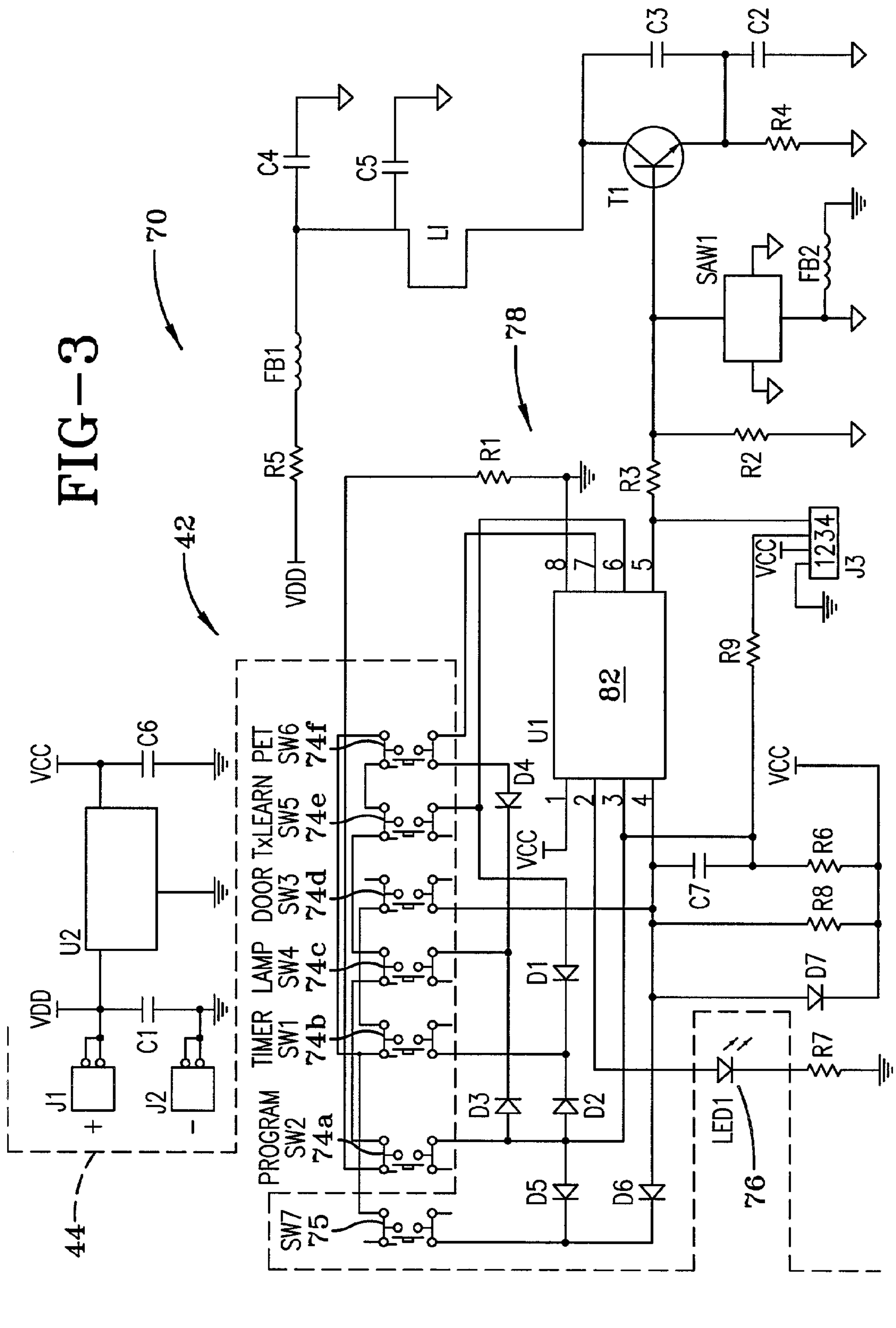
FIG. 3 is an electrical schematic diagram of a wall station transmitter utilized in the present invention.

Referring now to FIG. 3, an electrical schematic diagram of a wall station circuit is designated generally by the numeral 70. It will be appreciated that the wall station circuit 70 is contained within the wall station 42 inasmuch as the wall station housing 44 encloses most all of the components of the circuit 70. There are a plurality of external components which extend outwardly from the housing so that they may be accessed by a person desiring to initiate certain operator functions. These external components include a plurality of buttons 74*a–f*. The buttons 74 may be used for up/down movement of the door, for learning a remote transmitter to be associated with the operator, for setting a pet height for the door or other functions. A light emitting diode (LED) 76 partially extends from the housing 44 and is visible to the user to indicate the status of the station and its related components. One of the buttons 74 is a dual-purpose button 74*c*. The button 74*c* in a normal or a first way of operation of the wall station is used to turn the light 62 on or off. But, as will be hereinafter discussed in detail, the button 74*c* may also be actuated in a non-standard way to function as a user-changeable-code button. An internal or hidden button 75 is enclosed in the housing 44 and not readily accessible to the person who uses the wall station. The hidden button 75 functions as a user-changeable code (UCC) button, but with a different implementation sequence than button 74*c*. The wall station circuit 70 includes various internal components 78 which are readily identifiable by one skilled in the art.

An encoder 82 is one of the internal components contained within the housing 44 and is a controller-based device which provides the necessary hardware, software and memory for enabling the transmission of the appropriate signal to the controller 52. In particular, the encoder 82 may be a device such as Microchip Technology Inc. Part No. PIC12CE519 microcontroller. Such a device utilizes a processor, power latching and switching components, an EEPROM device, input ports for receiving programming instructions, and output ports for transmitting data and controlling the LED 76. The encoder 82 is electrically connected to all of the buttons 74*a–f* and 75 and receives input signals from the switches that are associated with each of the buttons.

Figure 4:
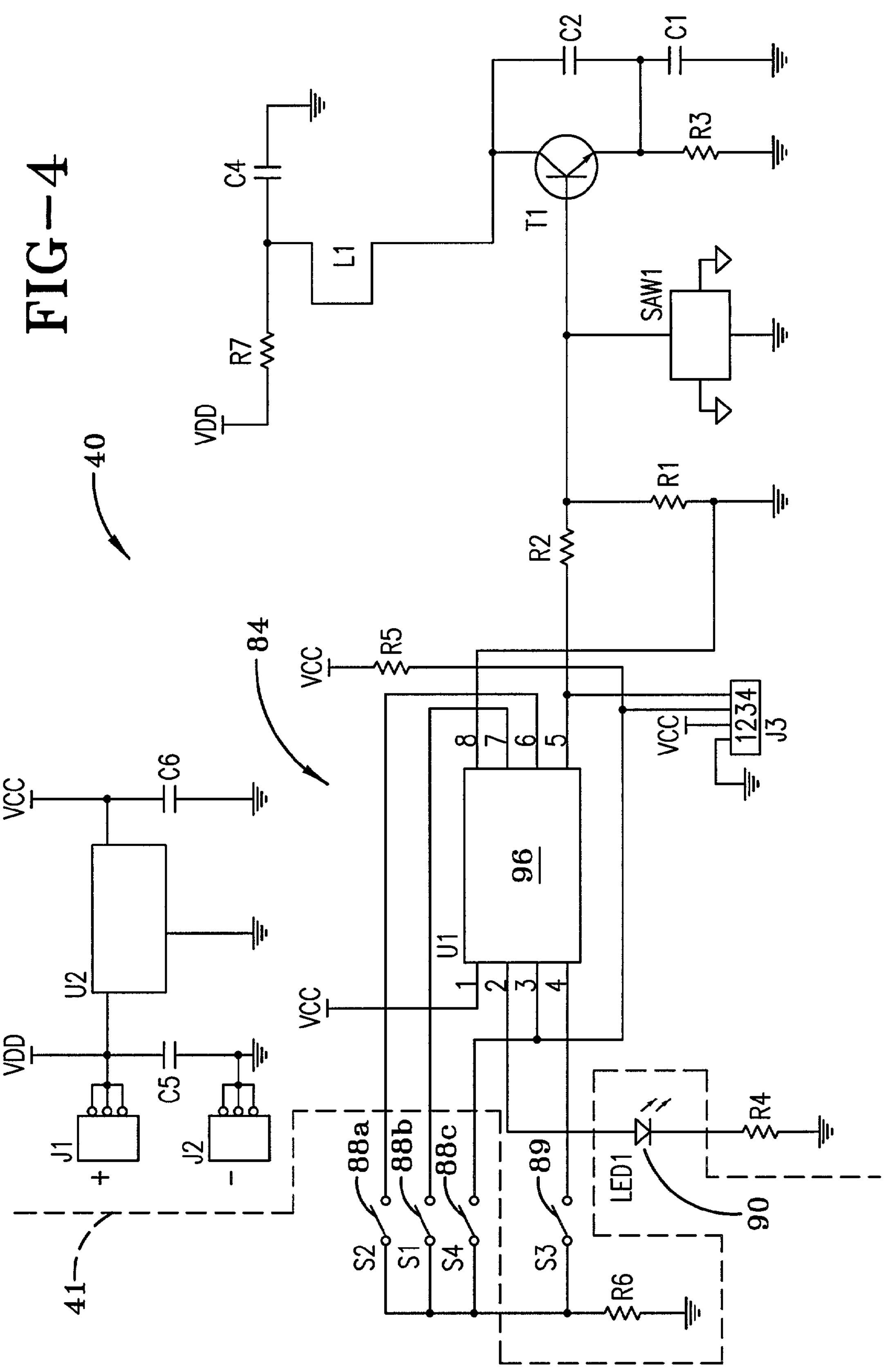
FIG. 4 is an electrical schematic diagram of a remote transmitter utilized in the present invention.

Referring now to FIG. 4 a similar circuit construction is shown for the remote transmitter 40. In particular, the remote transmitter includes a transmitter circuit 84 which also has a plurality of external components such as buttons 88*a–c* that extend from the housing 41. These different buttons allow a single remote transmitter to be used with different operator devices. The transmitter 40 also includes an externally extending LED 90 which indicates the operational status of the transmitter 40. One of the buttons 88*a*, in a normal or first way of operation, is used to initiate the open/close cycle of a barrier programmed to be responsive to normal actuation of that button. But, in a manner similar to the button 74*c* of the wall station control 42, the button 88*a* may also function in a nonstandard way as a user-changeable code button. An internal or hidden button 89 is enclosed in the housing 41 and not readily accessible to the person using the remote transmitter. The hidden button 89 functions as a user changeable code button, but with a different implementation sequence than button 88*a*. The transmitter includes an encoder 96 that is essentially similar in its operational functions as the encoder 82 described above for the wall station device. As such, the encoder 96 is electrically connected to the switches 88*a–c* and 89 and receives input signals from the switches that are associated with each of the buttons.

Figure 5:
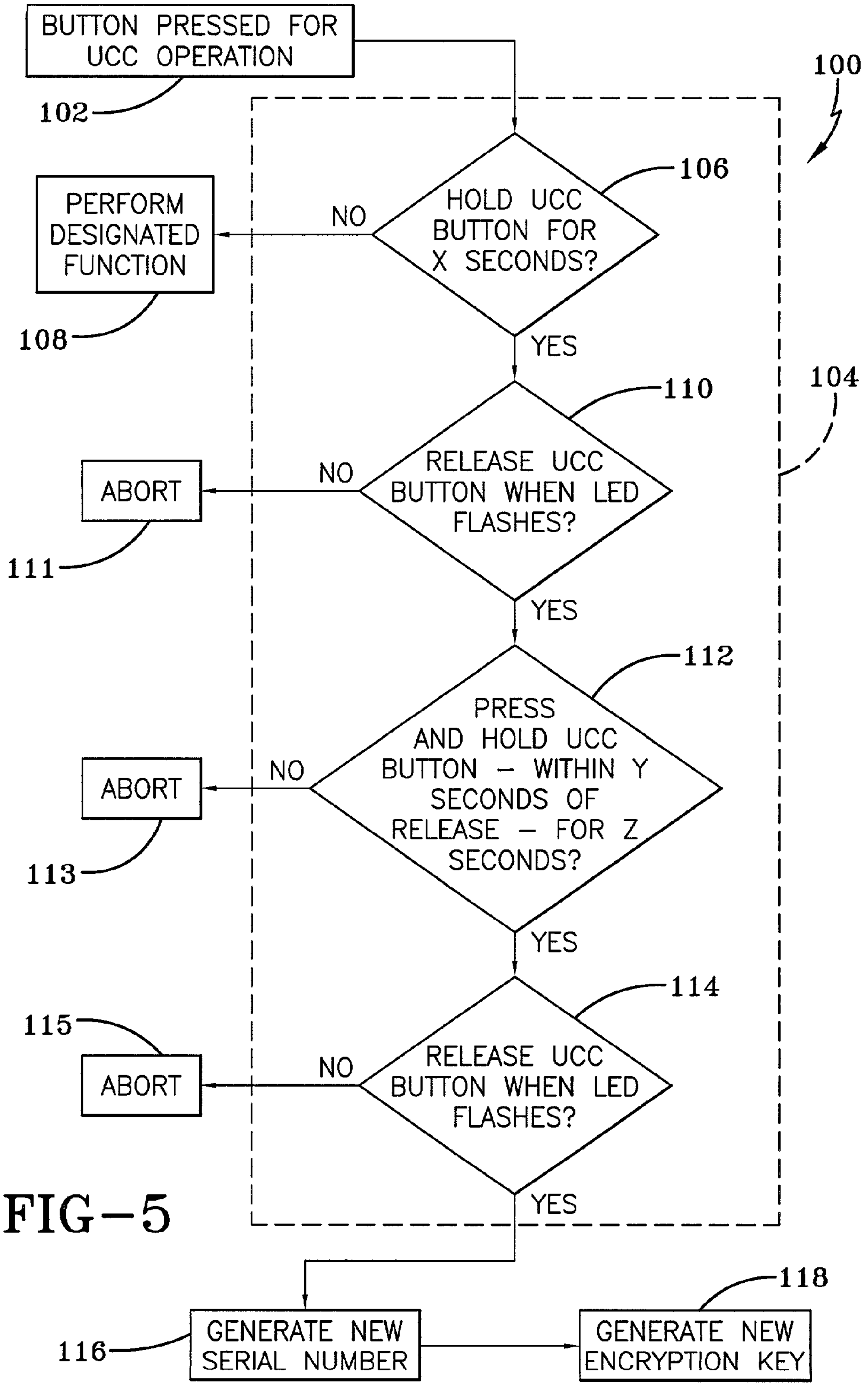
FIG. 5 is an operational flow chart employed by the transmitter and wall station of the present invention for generating a new serial number code.
Figure 6:
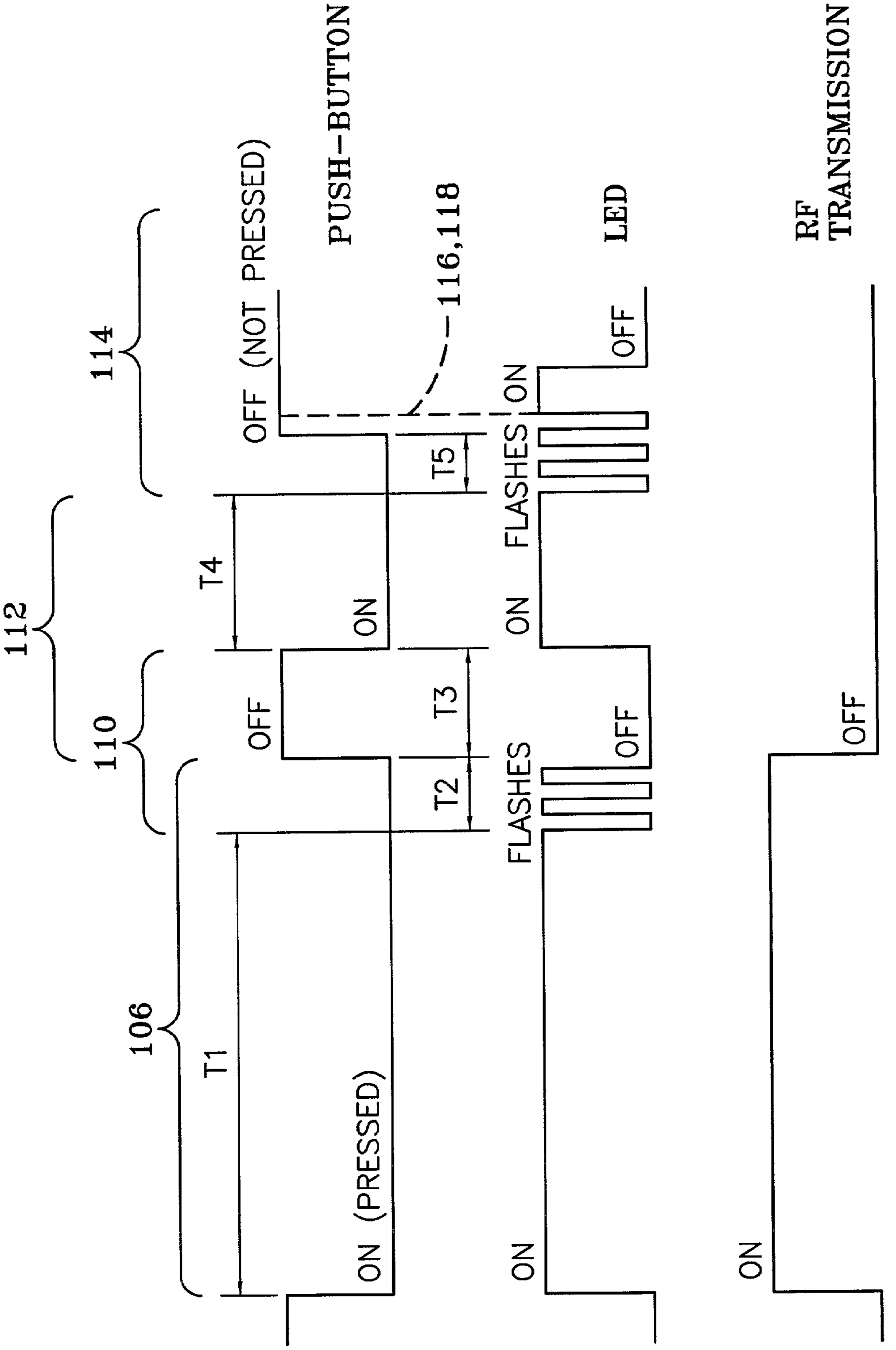
FIG. 6 is a timing sequence chart for illustrating the generation of a new serial number.

Referring now to FIGS. 5 and 6, the methodology for changing a transmitter code such as emitted by a remote transmitter 40 or a wall station 42 is designated generally by the numeral 100. The method described is applicable to both the remote transmitter and the wall station control using the externally accessible buttons 74*c* and 88*a*. As will be appreciated by those skilled in the art, previous systems employed a predetermined serial number that was programmed into each remote transmitter and wall station transmitter at the factory. In the event that the user wanted to prevent the transmitter from operating with a particular receiver, the user previously had no way for changing the serial number to do so. The present methodology overcomes this problem by utilizing the following steps.

The procedure for generating a new serial number starts at step 102 by pressing button 74*c* or 88*a*. As mentioned previously, either the remote transmitter or the wall station may be employed to generate a new serial number for the transmitter. Either button 74*c* or 88*a*—which may be referred to as the user-changeable code (UCC) button—allows the user to change the serial number. At step 104, the user undertakes a sequence of steps to generate a new serial number. Briefly, step 104 in the preferred embodiment employs a sequence of button actuations to ensure that the user expressly wants to change the remote or wall station transmitter's serial number. In other words, since the buttons to be used are readily available to the user, it is believed that the sequence of steps to be described in steps 106–115 are such that an inadvertent changing of the serial number would not be possible. Accordingly, although the steps that follow are believed to be the preferred way for changing the serial number using a readily accessible button, other similar sequences using one or multiple buttons, or different length time periods of button actuation or a different number of time periods could be employed for the purpose of changing the transmitter's serial number code.

At step 106, the encoder 96, 82 determines whether the user-changeable code button 74*c* or 88*a* has been held for a predetermined amount of time, for example about 10 seconds. If the button 74*c* or 88*a* is held then released prior to expiration of the predetermined amount of time, then only the button's predesignated function is performed at step 108. While the button 74*c* or 88*a* is pressed during a time period T1, the LED 76 or 90 is illuminated and an RF transmission is emitted. If, however, the button 74*c* or 88*a* is held for the predetermined period of time at step 106—as designated in FIG. 6 by the time period T1—and the button is released at step 110 upon commencing of the LED 76 or 90 flashing as designated in time period T2, then the process is allowed to continue. But, if at step 110 the button 74*c* or 88*a* is not released within time period T2, then the process is aborted at step 11. Upon release of the button 74*c* or 88*a*, the LED 76 or 90 stops flashing and the RF transmission ends. It should be noted that an audible or tactile stimulus could be generated instead of using a flashing LED light to indicate imminent expiration of a time period.

At step 112, upon successful completion of step 110, the user must then press and hold the user-changeable code button 74*c* or 88*a* for a time period T4 within a predetermined period of time T3 which is preferably within four seconds of the release of the user-changeable code button. When the UCC button is pressed again at step 112, the LED 76 or 90 is illuminated for a period of about five seconds. At the end of this period, if the button is still held, the LED begins to flash for a period of time designated as T5 which in the preferred embodiment is about four seconds. If, at step 112, the button 74*c* or 88*a* is not pressed within time period T3, then the process is aborted at step 113.

At step 114, if the button 74*c* or 88*a* is released within the designated period of time T5, the process continues on to step 116 which generates a new serial number and step 118 which generates a new encryption key. But, if the button 74*c* or 88*a* is not released within time period T5, which is about four seconds of the LED flashing, the user-changeable code sequence is aborted at step 115.

Figure 7:
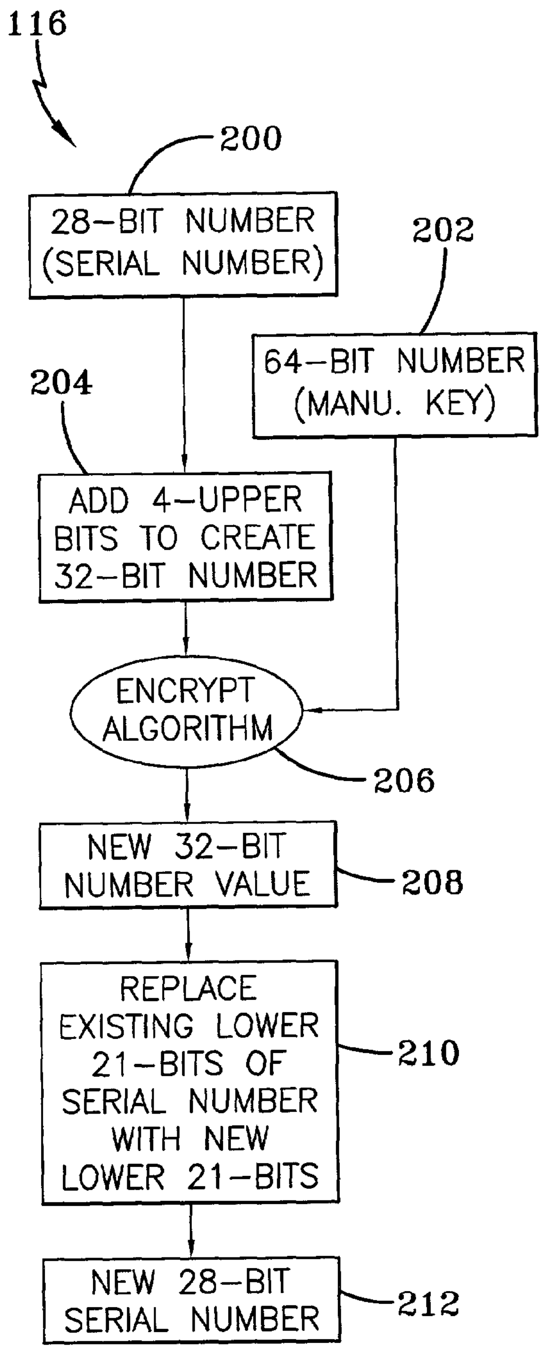
FIG. 7 is an operational flow chart employed by the transmitter and wall station for generating a new serial number code.

Referring now to FIG. 7, the steps employed in generating the new serial number at step 116 are shown. Initially, the generation of the new serial numbers starts with the original 28-bit number—the current serial number—at step 200, and the 64-bit number—the current manufacturer's key—at step 202. Next, at step 204 the encoder within the transmitter or wall station adds 4-upper bits to create a 32-bit number. Both this new 32-bit number and the 64-bit manufacturer's key are encrypted by an algorithm at step 206 which in turn generates a new 32-bit number value at step 208. At step 210, the encoder replaces the existing lower 21-bits of the serial number with a new lower 21-bits derived from the new 32-bit number value. These lower 21-bits are employed and used in conjunction with the remaining 7-bits of the original serial number to generate a new 28-bit serial number at step 212. Alternatively, the new 28-bit serial number could be generated by a true random number generator.

Figure 8:
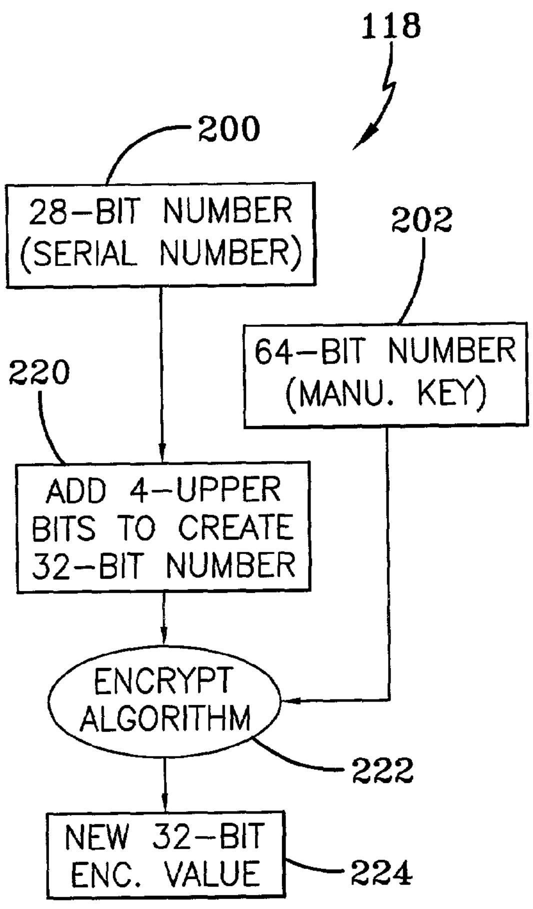
FIG. 8 is an operational flow chart employed by the transmitter and wall station for generating a new encryption key.

Referring now to FIG. 8, the process steps for generating a new encryption key at step 118 are shown. In particular, the process 118 includes utilizing the new 28-bit number from step 212 and the 64-bit number which is the manufacturer's key from step 202. At step 220, 4-upper bits are added to the 28-bit number to generate the 32-bit number. This 32-bit number and the 64-bit manufacturer's key are then combined in a secret, complex mathematical algorithm that is contained within the encoder so as to generate a new 32-bit encryption key. The new serial number and the new encryption key are then employed by the transmitter for generating a 66-bit word which includes 6 bits for function identification, that is transmitted and receivable by the operator and then decrypted so that it ultimately performs the appropriate function. Of course, the transmitter with its new serial number must be learned to the particular operator as described in the sequence below.

As part of the step of generating a new serial number it will be appreciated that the software algorithm included in the encoder utilizes a pseudo-random number generator. Pseudo-random generation to an outside viewer or user is a random number generator, but the generator uses a "seed value," which is the existing serial number, to generate the new serial number. Putting a specific "seed value" into the generator always produces the same outcome value. Utilizing the embedded encryption algorithm in the encoder has been found an effective way to generate a new serial number.

Alternatively, if desired, generation of a new serial number may be accomplished by actuation of a single, restricted access, user-changeable code button 80 or 94. The restricted access button 80 or 94 is contained with the respective housing in a manner so that a user cannot inadvertently actuate such a button. In this instance, the user must physically open the housing and then actuate the button to implement the generation of a new serial number as designated in steps 102, 116, and 118 as discussed above. This is simply an alternative for generating a new serial number that does not require a special sequence of steps as set forth in method step 104 described above.

Figure 9:
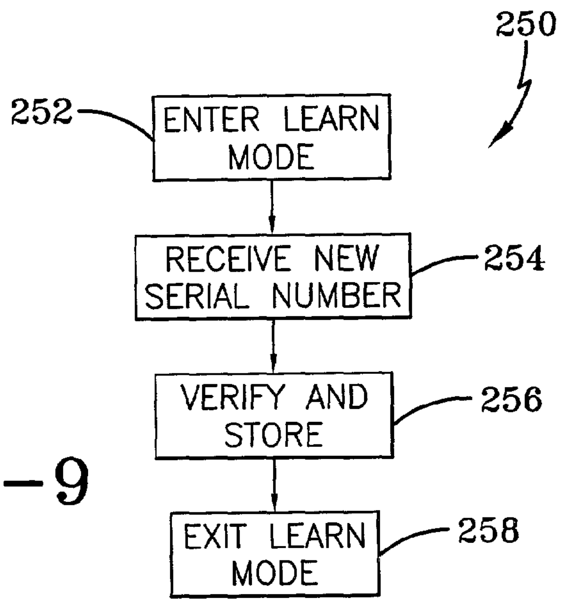
FIG. 9 is an operational flow chart employed by the operator for learning a new serial number.

Referring now to FIG. 9 it can be seen that an operational flow chart, which discloses how the transmitter or wall station is utilized to associate the new serial number with an operator, is designated generally by the numeral 250. At step 252, the user places the operator in a learn mode. This may be done by depressing a learn button on the wall station control 42 or any number of other ways. This prepares the controller 52 for accepting a new serial number. Next, at step 254, the user transmits the new serial number by pressing the normal transmit button on the remote device or on the wall station so that it is received by the controller 52. At step 256, the controller verifies that the serial number is valid and that all other information transmitted with the radio frequency transmission is proper and correct and then the controller stores the new serial number in the memory device 54. Once this step is complete, the learn mode is automatically exited at step 258 and the operator returns to an operate mode.

Based upon the foregoing it will be readily apparent to one skilled in the art that there are several advantages realized by the invention disclosed herein. Utilizing the embedded code hopping system of the encoders in this invention allows the user to have the transmitter self-generate a new serial number. This automatically un-learns or disables the transmitter from operating an operator or receiver device that it had previously learned. This can be used for security purposes to prevent someone from using a transmitter or remote device that has been stolen.

Thus, it can be seen that one or more of the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator for controlling a position of a barrier, comprising:

at least one radio frequency transmitter having a predetermined serial number for radio frequency transmitting a radio frequency transmission corresponding to the transmitter, wherein said predetermined serial number remains the same in said radio frequency transmissions;

a radio frequency receiver adapted to receive a first radio frequency transmission from a first radio frequency transmitter and adapted to receive a second radio frequency transmission from a second radio frequency transmitter having a second serial number, said radio frequency receiver receiving said serial numbers that remain the same when in an operate mode;

a memory comprising a plurality of storage locations; and a controller having a controller controlled serial number location pointer and responsive to the reception by said radio frequency receiver of said first-mentioned radio frequency transmission for storing a first serial number corresponding to said first radio frequency transmitter in one of said plurality of storage locations derived from the controller serial number location pointer, the controller responsive to the reception by said radio frequency receiver of said second radio frequency transmission for storing a second serial number corresponding to said second radio frequency transmitter in another of said plurality of storage locations derived from the controller serial number location pointer, and said controller responsive to said operate mode and the reception of said first-mentioned radio frequency transmission after the storage of said first stored serial number for moving the barrier and said controller responsive to said operate mode and the reception of said second radio frequency transmission after the storage of said second stored serial number for moving baffler, and said controller responsive to a learn mode wherein said radio frequency receiver is adapted to receive new radio frequency transmissions from said radio frequency transmitter which has a new user-changeable serial number changed by the user from said predetermined serial number, said new user-changeable serial number remaining the same when subsequently transmitting said radio frequency transmissions in said operate mode.

2. The operator according to claim 1, wherein said controller serial number location pointer comprises a software controlled code location pointer.

3. The operator according to claim 1, wherein said controller comprises a microprocessor.

4. An operator for controlling a position of a barrier comprising:

at least one radio frequency transmitter having a predetermined serial number for radio frequency transmitting a radio frequency transmission corresponding to the transmitter, wherein said predetermined serial number always remain the same in said radio frequency transmissions while other portions of said radio frequency transmissions may change;

a radio frequency receiver adapted to receive a first radio frequency transmission from a first radio frequency transmitter and adapted to receive a second radio frequency transmission from a second radio frequency transmitter having a second serial number, said radio frequency receiver receiving said serial number that always remain the same when in an operate mode;

a memory comprising a plurality of storage locations; and a controller connected to said radio frequency receiver, wherein said controller in said operate mode compares any radio frequency transmissions received with learned serial numbers stored in said plurality of storage locations, wherein said controller in said operate mode enables movement of the barrier when any one of said radio frequency transmissions matches any one of said learned serial numbers stored in said plurality of storage locations, and said controller responsive to a learn mode wherein said radio frequency receiver is adapted to receive new radio frequency transmissions which have a new user-changeable serial number changed from said predetermined serial number by the user from one of said first and second radio frequency transmitters, said new user-changeable serial number always remaining the same when said radio frequency transmitters transmit in said operate mode.

5. The operator according to claim 4, wherein said at least one radio frequency transmitter comprises:

a function button that when actuated in a first way performs a predetermined function and generates said radio frequency transmission which always includes said predetermined serial number that remains the same and wherein said function button when actuated in a second way changes said predetermined serial number to said new user-changeable serial number which is included in said radio frequency transmission when said function button is subsequently actuated in said first way.

6. The operator according to claim 5, wherein said radio frequency transmitter includes an encoder which is initially programmed with a manufacturer's key and said predetermined serial number, wherein actuation of said function button in said second way causes said encoder to encrypt said predetermined serial number with said manufacturer's key to generate said new user-changeable serial number.

7. The operator according to claim 6, wherein said encoder encrypts said new user-changeable serial number with said manufacturer's key to generate a new encryption key.

8. The operator according to claim 5, wherein said processor is placed in a learn mode prior to storing said new user-changeable serial number.

* * * * *

UNITED STATES PATENT AND TRADEMARK OFFICE

CERTIFICATE OF CORRECTION

PATENT NO. : 6,963,267 B2 
DATED : November 8, 2005
INVENTOR(S) : James S. Murray It is certified that error appears in the above-identified patent and that said Letters Patent is hereby corrected as shown below:

Column 9,
Line 59, delete “baffler”, and substitute -- barrier --.

Column 10,
Line 21, delete “remain”, and substitute -- remains --.

Signed and Sealed this

Fourteenth Day of February, 2006

JON W. DUDAS
*Director of the United States Patent and Trademark Office*